United States Patent
Pachler

(10) Patent No.: US 10,913,359 B2
(45) Date of Patent: Feb. 9, 2021

(54) POSITIONING UNIT AND CONTACTING METHOD

(71) Applicant: Schunk Transit Systems GmbH, Bergheim (AT)

(72) Inventor: Alexander Pachler, Salzburg (AT)

(73) Assignee: SCHUNK TRANSIT SYSTEMS GMBH, Bergheim (AT)

( * ) Notice: Subject to any disclaimer, the term of this patent is extended or adjusted under 35 U.S.C. 154(b) by 138 days.

(21) Appl. No.: 16/086,660

(22) PCT Filed: Feb. 24, 2017

(86) PCT No.: PCT/EP2017/054277
§ 371 (c)(1),
(2) Date: Sep. 20, 2018

(87) PCT Pub. No.: WO2017/162398
PCT Pub. Date: Sep. 28, 2017

(65) Prior Publication Data
US 2019/0105989 A1     Apr. 11, 2019

(30) Foreign Application Priority Data
Mar. 24, 2016  (DE) .................. 10 2016 205 012

(51) Int. Cl.
*B60L 5/30* (2006.01)
*B60L 5/24* (2006.01)

(52) U.S. Cl.
CPC .. *B60L 5/30* (2013.01); *B60L 5/24* (2013.01)

(58) Field of Classification Search
CPC ..................................... B60L 5/24; B60L 5/30
See application file for complete search history.

(56) References Cited

U.S. PATENT DOCUMENTS 5,124,510 A * 6/1992 Garfinkle ............... B60L 5/19
                                                     191/59.1
5,651,434 A * 7/1997 Saunders ............... B60L 53/30
                                                     191/2
(Continued)

FOREIGN PATENT DOCUMENTS

DE        4025279 A1    2/1992
DE        4334716 A1    4/1995
(Continued)

OTHER PUBLICATIONS

English Machine Translation Abstract of DE19540913C1 dated Feb. 6, 1997.
(Continued)

*Primary Examiner* — Jason C Smith
(74) *Attorney, Agent, or Firm* — King & Schickli, PLLC

(57) ABSTRACT

A positioning unit and method for forming an electrically conductive connection between a stationary charging station and a vehicle, wherein an electrical charging contact of a positioning unit is movable relative to a charging contact surface and contacted by the positioning unit having an articulated arm device and a corresponding drive device, wherein the charging contact includes a contact position for power transmission and a retracted position for power interruption, the drive device having an adjustment drive acting on the articulated arm device and a spring device wherein a contact force acting on the charging contact surface can be formed by the adjustment drive having a control device and an electric motor actuated by the control device, wherein the adjustment drive is designed such that a torque of the electric motor is detected by the control device, and the contact force controlled by the control device based on the torque.

19 Claims, 3 Drawing Sheets

(56) References Cited

U.S. PATENT DOCUMENTS

| | | | | |
|---|---|---|---|---|
| 5,709,292 A * | 1/1998 | Breitbach | | B60L 5/26 191/65 |
| 5,732,803 A * | 3/1998 | Breitbach | | B60L 5/30 191/55 |
| 6,131,520 A * | 10/2000 | Dull | | B60L 5/19 105/164 |
| 2010/0322465 A1* | 12/2010 | Wesche | | B60M 1/28 382/100 |
| 2012/0013743 A1* | 1/2012 | Tanarro Marquez | | B60L 5/26 348/148 |
| 2013/0264163 A1* | 10/2013 | Mishra | | E21F 17/06 191/65 |
| 2013/0270050 A1* | 10/2013 | Yamada | | B60L 5/30 191/59 |
| 2014/0041951 A1* | 2/2014 | Tojima | | B60L 3/0023 180/2.1 |
| 2014/0202817 A1* | 7/2014 | Nitti | | B60L 5/02 191/59.1 |
| 2015/0034441 A1* | 2/2015 | Nakajima | | B60L 5/24 191/59.1 |
| 2015/0136555 A1* | 5/2015 | Kanazawa | | B60L 5/30 191/59.1 |
| 2015/0352959 A1* | 12/2015 | Buehs | | B60L 5/19 191/59.1 |
| 2016/0152142 A1* | 6/2016 | Goldwin | | B60L 5/06 248/205.1 |
| 2016/0167524 A1* | 6/2016 | Bedell | | B60L 5/18 191/22 R |
| 2016/0185227 A1* | 6/2016 | Pachler | | B60L 53/14 320/107 |
| 2016/0375796 A1* | 12/2016 | Gruenjes | | B60M 1/02 191/33 R |
| 2017/0113554 A1* | 4/2017 | Doddakula | | B60L 5/16 |
| 2017/0124783 A1* | 5/2017 | Alm | | B60K 6/48 |
| 2018/0251033 A1* | 9/2018 | Tsutsumi | | B60L 5/16 |
| 2019/0001823 A1* | 1/2019 | Duprat | | B60L 5/08 |
| 2019/0105989 A1* | 4/2019 | Pachler | | B60L 5/30 |
| 2020/0009955 A1* | 1/2020 | Nakamura | | B60K 6/22 |

FOREIGN PATENT DOCUMENTS

| | | |
|---|---|---|
| DE | 19540913 C1 | 2/1997 |
| DE | 102004031572 A1 | 2/2006 |
| DE | 202014007218 U1 | 11/2014 |
| GB | 2518129 A | 3/2015 |
| WO | WO2015022008 A1 | 2/2015 |

OTHER PUBLICATIONS

Collina, et al.; "An Application of Active Control to the Collector of an High-Speed Pantograph: Simulation and Laboratory Tests"; 44th IEEE Conference on Decision and Control; Seville, Spain; Dec. 2005.

* cited by examiner

POSITIONING UNIT AND CONTACTING METHOD

FIELD OF THE INVENTION

This invention relates to a positioning unit as well as a method for forming an electrically conductive connection between a stationary charging station and a vehicle, in particular an electric bus or similar, wherein an electrical charging contact of the positioning unit can be moved relative to a charging contact surface and contacted with same by means of the positioning unit, wherein the positioning unit has an articulated arm device and a drive device for driving the articulated arm device, wherein the charging contact can be positioned between a contact position for power transmission and a retracted position for power interruption by means of the articulated arm device, wherein the drive device has an adjustment drive for forming an adjustment force acting on the articulated arm device and a spring device mechanically cooperating with the adjustment drive, wherein a contact force acting on the charging contact surface can be formed by the adjustment drive, wherein the adjustment drive has a control device and an electric motor, which can be actuated by the control device.

BACKGROUND OF THE INVENTION

Such positioning units and methods are known from the state of the art and are regularly used for electrically driven vehicles that operate between stations. This could refer to electric busses but basically also other vehicles, for example a train or a tram that is not permanently electronically connected to a contact wire or similar. With these vehicles, charging of an electrical energy storage takes place through a charging station while the vehicle is stopping at a station. At the station, the vehicle is electronically connected to the charging station, wherein the energy storage is recharged at least enough for the vehicle to reach the next station with a charging station. To establish an electrical connection between the vehicle and the charging station, a positioning unit that can be mounted on a roof of the vehicle or alternatively above the vehicle, for example on a pole, is used. The positioning unit is then able to connect a charging contact with a charging contact surface, enabling the vehicle or rather the energy storage to be charged at the station.

When connecting the charging contact with the charging contact surface it is essential that the charging contact is pressed onto the charging contact surface with a defined contact force to be able to establish a safe electrical connection. From DE 202014007218 U1 a positioning unit above a vehicle is known, wherein the positioning unit comprises an articulated arm device and a drive device. The drive device has an adjustment drive and a spring device that serve the purpose of moving the articulated arm device relatively to the charging contact surface of the vehicle. Especially an upward movement of the articulated arm device requires an adjustment force of the adjustment drive.

With known positioning units it is always disadvantageous that they have to be designed and arranged for a defined contact height, meaning a distance of the positioning unit in a retracted position for the storage of the charging contact relative to a contact position for the power transmission to the vehicle. This means that a relative distance between the contact position and the retracted position is not variably useable and has to be frequently set or adjusted through structural changes because otherwise the necessary or desired contact force cannot be applied onto the charging contact surface. Especially when vehicle types and thus the heights of the vehicles change, a relative distance between the retracted position and the contact position can vary widely as a result of height differences of the vehicles' contact surfaces above a road. The same applies to different loads of a vehicle or the lowering of a vehicle or a bus in the area of a station to facilitate entry for persons with, for example, physical impairments. When the vehicle is lowered, the charging contact moves in the vertical direction relative to the charging contact surface if the contact force can no longer be upheld. However, adjusting a contact force through the implementation of sensors on the charging contact or on the articulated arm device in combination with a control is costly and requires high maintenance, which would significantly increase production and operational costs of a positioning unit.

From DE 4334716 A1 a positioning unit equipped with such sensors for forming a defined contact force is known, wherein this positioning unit serves for current collection on a contact wire and the contact force is measured and controlled by the positioning unit.

SUMMARY OF THE INVENTION

It is therefore the object of the invention to propose only one positioning unit and one method for forming an electrically conductive connection between a vehicle and a charging station which allow safe contacting of the vehicle while at the same time having low production and operational costs.

This object is attained by a positioning unit with the characteristics of claim 1 and a method with the characteristics of claim 10.

The positioning unit according to the invention for forming of an electrically conductive connection between a stationary charging station and a vehicle, in particular an electric bus or similar, is designed in such a way that an electrical charging contact of the positioning unit can be moved relative to a charging contact surface and contacted with same by means of the positioning unit, wherein the positioning unit has an articulated arm device and a drive device for driving the articulated arm device, wherein the charging contact can be positioned between a contact position for power transmission and a retracted position for power interruption by means of the articulated arm device, wherein the drive device has an adjustment drive for forming an adjustment force acting on the articulated arm device and a spring device mechanically cooperating with the adjustment drive, wherein a contact force acting on the charging contact surface can be formed by the adjustment drive, wherein the adjustment drive has a control device and an electric motor, which can be actuated by the control device, wherein the adjustment drive is designed in such a way that a torque of the electric motor can be detected by the control device, wherein the contact force can be controlled by the control device in accordance with the torque of the electric motor.

The positioning unit can therefore be part of a stationary charging station for an electrically driven vehicle or part of an electrically driven vehicle, wherein the positioning unit serves the purpose of moving the charging contact of the charging station or of the vehicle onto a charging contact surface of the vehicle or of the charging station and electronically connect it thereto. It is then possible to provide the vehicle with electrical energy during a stop at the charging station and to store this energy in the vehicle. The movement of the charging contact onto the charging contact surface and back is performed by the articulated arm device and the drive device of the positioning unit. For this purpose, the charging contact is located at one end of the articulated arm device. The drive device serves the purpose of moving the charging contact and therefore the articulated arm device from a retracted position for the storage of the charging contact to a contact position for the power transmission or the contacting of the charging contact surface with the charging contact. The positioning unit forms a defined contact force acting on the charging contact surface in the contact position. In the retracted position, however, no adjustment force at all or only very little can act on the articulated arm device, so that no movement of the articulated arm device and of the charging contact is possible. The adjustment force acting on the articulated arm device is produced by the adjustment drive of the drive device, wherein the adjustment drive cooperates mechanically with the spring device. The adjustment force depends on a mechanism of the articulated arm device or a transmission of the adjustment drive and hardly changes during a movement of the charging contact. During the contacting of the charging contact with the charging contact surface the adjustment force is increased by the adjustment drive and leads to formation or increase of the contact force acting on the charging contact surface.

The adjustment drive also has a control device that can, for example, also be an electronic control system for the electric motor. In this case, the electronic control system can be integrated directly into the electric motor. The control device can detect a torque of the electric motor through, for example, the energy spent and can control the electric motor in such a way that the defined contact force of the electric motor is exerted onto the charging contact surface via the articulated arm device and the charging contact. It is then possible to actively adjust a direct force action onto the articulated arm device and, if applicable, onto the charging contact, optionally also in accordance with various influencing factors. Thereby it is possible to form an ever-constant contact force acting onto the charging contact surface irrespective of a relative distance between the charging contact surface and the positioning unit or of a height of the vehicle.

The electric motor can be a brushless electric motor. If the adjustment drive has a brushless electric motor, a particularly large number of movement cycles can be performed. A brushless electric motor requires significantly fewer and longer maintenance intervals than a brushed electric motor having the same mechanical performance characteristics. Thereby it is overall possible to design a positioning unit with extended maintenance intervals or with a longer service life. A three-phase asynchronous induction machine with a squirrel-cage rotor or also an a synchronous machine with electronic generation of a rotary field or a brushless dc motor can, for example, be used as a brushless motor or electric motor without sliding contacts between rotor and stator.

The adjustment drive can be a linear drive, preferably a spindle drive, particularly preferably a spindle drive without self-locking. The spindle drive can then have a corresponding spindle with a pitch that can prevent self-locking of the spindle drive. The linear drive can cause movement of the articulated arm device from the retracted position into the contact position and vice versa. The spindle can in particular be a ball screw spindle or a trapezoidal thread spindle that can be coupled to an electric motor.

The adjustment drive and/or the articulated arm device can have a displacement sensor and/or a position sensor. By using a displacement sensor it is then possible to set a range in which the articulated arm device can move by means of the adjustment drive. An incremental encoder or an absolute encoder can, for example, be used as a displacement sensor. It is then also possible to define an exact working position of the adjustment drive or of the charging contact at all times. The adjustment drive can also have limit switches that can be operated depending on the position and/or pressure switches that can be operated depending on the force. Furthermore, a height of a contact force can also be limited by making the adjustment drive extendable only to a certain limited position. In addition, pressure switches for the limitation of the contact force that can serve as a limitation for the adjustment drive themselves or together with the limit switches can additionally be used. A pressure switch can be located directly on the charging contact or also on the articulated arm device or on the adjustment drive.

The spring device can have at least one tension spring or one compression spring that can generate a spring force on the articulated arm device. The use of a tension spring is preferred because a tension spring can be connected especially easily to the articulated arm device. It can also be intended that the spring device has a plurality of springs and that the spring force is constantly acting on the articulated arm device. The spring can therefore be prestressed in each position of the articulated arm device. A compression spring can alternatively be used for forming the spring force. Such a spring device is particularly robust and can be produced easily and inexpensively.

A spring of the spring device can be mechanically coupled with the articulated arm device by means of a lever of a transmission of the spring device, wherein an effective length of the lever is designed to be variable in accordance with a position of the articulated arm device. The lever can therefore be attached directly to the articulated arm device, so that a spring force of the spring can directly be transferred onto the articulated arm device. Depending on the position or the direction of the spring force of the spring and the arrangement of the lever on the articulated arm device, the effective length of the lever can be shortened if an angle between the direction of the spring force and the extension of the lever is less than or greater than 90°. An effective length of the lever can also be adjusted by attaching the spring to the articulated arm device via a restoring gear, for example formed by a cam or a drawbar, with an end stop. The cam then forms the lever of the restoring gear. Depending on the position of the cam relative to the spring, the effective length of the lever can be affected. This way it is possible to achieve the same amount of restoring force on the articulated arm device at all times irrespective of a position of the articulated arm device or to increase or decrease the restoring force in accordance with a position of the articulated arm device according to the respective requirements. The restoring force can also be matched to the adjustment force and the contact force. It is advantageous for the restoring force to be determined in such a way that a retracting of the charging contact takes place automatically as a result of the restoring force in every position of the articulated arm device if the adjustment drive fails, for example due to a power outage. This way, the positioning unit can be operated in a particularly safe manner.

In an advantageous embodiment, the positioning unit comprises a holding device for fixing the positioning unit to a pole or an underpass above a vehicle, wherein the spring device can comprise at least a restoring spring for forming a restoring force acting on the articulated arm device, wherein the restoring force is then greater than a gravitational force of the articulated arm device acting on the restoring spring in the opposite direction. The holding frame can, for example, form or comprise fixed bearings for the articulated arm device and the adjustment drive. In particular, the restoring spring or the adjustment drive can be attached directly to a fixed bearing on the holding frame. The holding frame can also be attached especially simply to the pole or the underpass as well as to a roof of a station, a tunnel or similar facilities that vehicles can drive under. Due to the fact that the positioning unit can be arranged above a vehicle, the adjustment drive can be formed as a lowering drive for lowering the contact element and cooperate mechanically with the spring device or the restoring spring. The charging contact can be easily restored into the retracted position on the positioning unit above the vehicle after a contacting of the charging contact surface with the charging contact if the spring device generates the restoring force on the articulated arm device by means of the at least the one restoring spring. Due to the restoring force then possibly being greater than a gravitational force of the articulated arm device acting on the restoring spring in the opposite direction, the articulated arm device can be moved from the contact position to the retracted position without the adjustment drive being active or supplied with power. Even if the charging contact is located in the retracted position, the restoring force is then counteracting the gravitational force and is preferably slightly greater than the gravitational force in order to prevent the charging contact from lowering or extending when there is no additional force acting on the articulated arm device.

In another advantageous embodiment, the positioning unit can comprise a holding device for fixing the positioning unit on the roof of a vehicle, wherein the spring device can comprise at least one lifting spring for forming of a lifting force acting on the articulated arm device, wherein the lifting force can then be smaller than a gravitational force of the articulated arm device acting on the lifting spring in the opposite direction. The holding frame can also form or comprise fixed bearings for the articulated arm device and the drive device, though it is then attached to the roof of the vehicle. The holding frame can be easily mounted on the roof via dampers, feet and/or isolators. In this way, the positioning unit can be exchanged especially easily. If the positioning unit is mounted on the roof of the vehicle, the adjustment drive can be a lifting drive for extending the charging contact that can cooperate mechanically with the spring device. A contacting of the charging contact surface with the charging contact can in this case also be performed simply by extending the charging contact into the contact position if the spring device comprises at least the lifting spring for forming the lifting force that, in cooperation with the adjustment force of the adjustment drive, acts on the articulated arm device, wherein the lifting force can be smaller than a gravitational force of the articulated arm device acting on the lifting spring in the opposite direction. Thus, a gravitational force of the articulated arm device and of the charging contact located on the articulated arm device can cause the articulated arm device to move from the contact position to the retracted position without this being initiated by the adjustment drive. The gravitational force acting in the opposite direction of the lifting force is preferably slightly smaller than the gravitational force in order to ensure the lowering of the charging contact in the case of, for example, a power outage. Furthermore, the lifting force is nevertheless supporting the adjustment drive when the latter causes the adjustment force acting on the articulated arm device during extension of the articulated arm device, so that only a small adjustment force needs to be exerted.

The articulated arm device can be designed as a single-arm system or as a scissors mechanism, preferably with a parallelogram linkage or as a pantograph. Thereby the articulated arm device can allow parallel movement of the charging contact starting from a retracted position of the charging contact towards the contact position on the charging contact surface. Additional damper elements that ensure a smooth motion sequence can be arranged on the articulated arm device. In the method according to the invention for forming an electrically conductive connection between a stationary charging station and a vehicle, in particular an electric bus or similar, an electrical charging contact of the positioning unit can be moved relative to a charging contact surface and contacted with same by means of the positioning unit, wherein an articulated arm device of the positioning unit is driven by a drive device of the positioning unit, wherein the charging contact can be positioned between a contact position for power transmission and a retracted position for power interruption by means of the articulated arm device, wherein an adjustment force acting on the articulated arm device is formed by means of an adjustment drive of the drive device and wherein a spring device of the drive device mechanically cooperates with the adjustment drive, wherein a contact force acting on the charging contact surface is formed by the adjustment drive, wherein an electric motor of the adjustment drive is actuated by a control device of the adjustment drive, wherein a torque of the electric motor is detected by the control device, wherein the contact force is controlled by the control device in accordance with the torque of the electric motor. In respect to the advantageous effects of the method according to the invention reference is made to the description of the advantages of the positioning unit according to the invention.

The contact force can be formed independent from a relative distance of the charging contact surface or of the contact position to the retracted position of the positioning unit. Therefore, it is possible to also contact vehicles that have different heights relative to a road with the positioning unit.

In the contact position, during adjustment of a relative distance of the charging contact surface or of the contact position from the retracted position of the positioning unit, the contact force can be constant. A change of a relative distance of a vehicle to the road always results in a change of the relative distance between the contact position and the retracted position as well. A change of the relative distance can be caused by the vehicle being lowered via a running gear or by the vehicle being loaded. Since the contact force is comparatively large relative to the adjustment force, the contact force can be substantially constant, even if the relative distance is changed. A constant contact force can be formed even more easily independent from the relative distance if the contact force is controlled by the control device in accordance with the torque of the electric motor. If the relative distance is increased by lowering the vehicle, the contact force and thus directly a torque of the electric motor decrease, the torque then being increased again by the control device, resulting in a constant contact force. Vice versa, decreasing the relative distance leads to an increase of a contact force and thus of the torque, which the control device can counteract by decreasing the torque.

The torque of the electric motor can be set in accordance with a position of the articulated arm device or the adjustment drive by means of the control device. Thereby it is then possible for a direct force action on the articulated arm device and, if applicable, on the contact element to be ideally matched to the respective position of the articulated arm device and therefore also for the direct force acting on the charging contact surface to be substantially constant irrespective of the position of the articulated arm device. A position of the articulated arm device can be detected through, for example, a displacement sensor and the torque can be adjusted beforehand in accordance with the position by the control device, so that controlling the torque for the adjustment of the contact force will not require any large torque steps.

When a limit value of the torque is exceeded, the control device can also detect that the contact position has been reached. The charging contact encounters the charging contact surface in the contact position, which causes the torque of the electric motor to increase significantly. This increase of the torque can be detected as the arrival of the control device in the contact position. For example, a possibly existing speed control of the electric motor can then be turned off because it is only necessary to readjust the torque of the electric motor in the contact position. Also, an enable signal for the transfer of energy from a charging station can then be released in the contact position by means of the control device, for example. Further sensors for the detection of the contact position are therefore not necessary.

The torque of the electric motor can be limited and constantly maintained by means of the control device once a target value of the torque has been reached. By limiting the torque, overloading of the electric motor is prevented as a start. Furthermore, it is then also possible to make the contact force constant. The same applies to an extension and a retracting speed of the charging contact, which can then be increased within limits.

The target value of the torque can be controlled within a tolerance range of +/−10% by means of the control device. This tolerance range is completely sufficient for forming a substantially constant contact force, so that a particularly precise detection of the torque of the electric motor through the control device is unnecessary. The control device can therefore be designed in a more inexpensive manner.

A maximum speed of the electric motor can be reached within a period of 0 to 7 seconds of the motor running, preferably within 1 to 3 seconds, by means of the control device. In this way, a direct force action as well as vibrations of the adjustment drive and the articulated arm device can be avoided or reduced. The thus controlled starting of the electric motor then also leads to an extension of a service life of the positioning unit.

The speed of the electric motor can be controlled by means of the control device in such a way that the charging contact is being moved at a constant velocity at least in sections. For example, it can be envisaged that, starting from the retracted position, the charging contact is extended with an initially positive acceleration or retracted with a negative acceleration, but that a major part of the distance of a movement of the charging contact into the contact position takes place at constant speed.

Further advantageous embodiments of the method are apparent from the dependent claims referring back to device claim 1.

BRIEF DESCRIPTION OF THE DRAWING FIGURES

In the following, preferred embodiments of the invention are explained in more detail with the aid of the attached drawings.

DETAILED DESCRIPTION OF THE INVENTION

Figure 1:
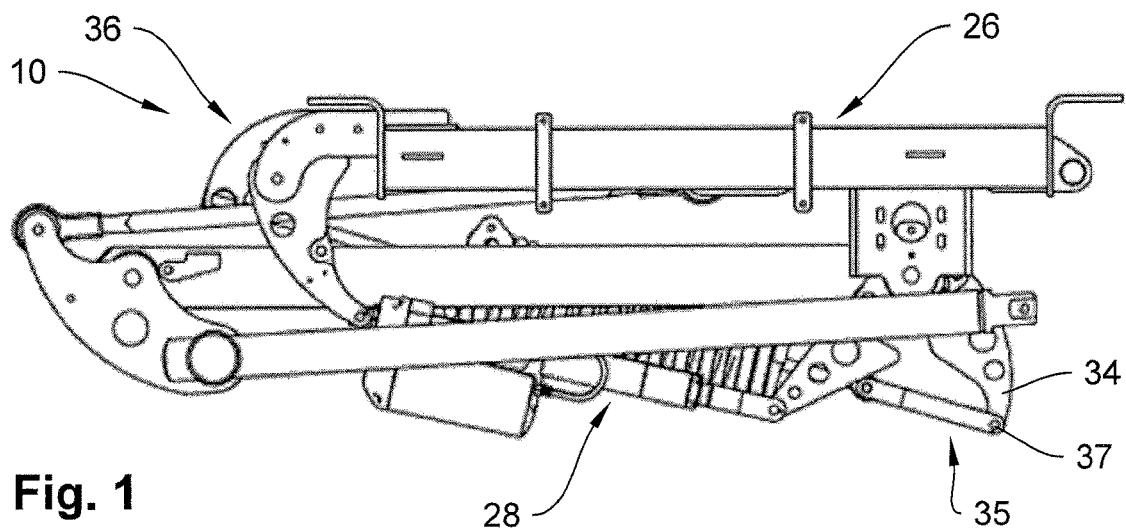
FIG. 1 shows a first embodiment of a positioning unit in a retracted position in side view.
Figure 2:
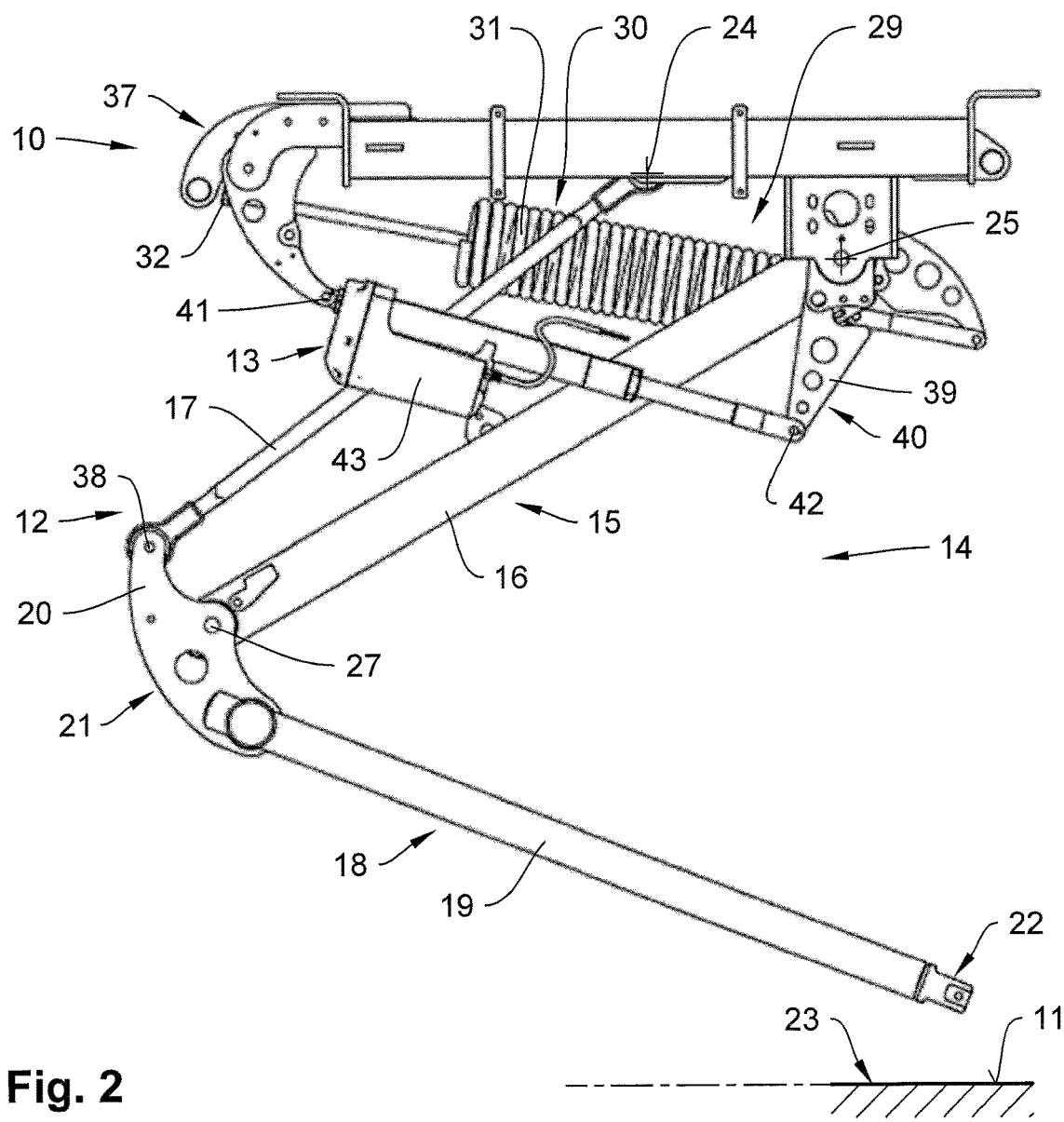
FIG. 2 shows the positioning unit in a contact position in side view.
Figure 3:
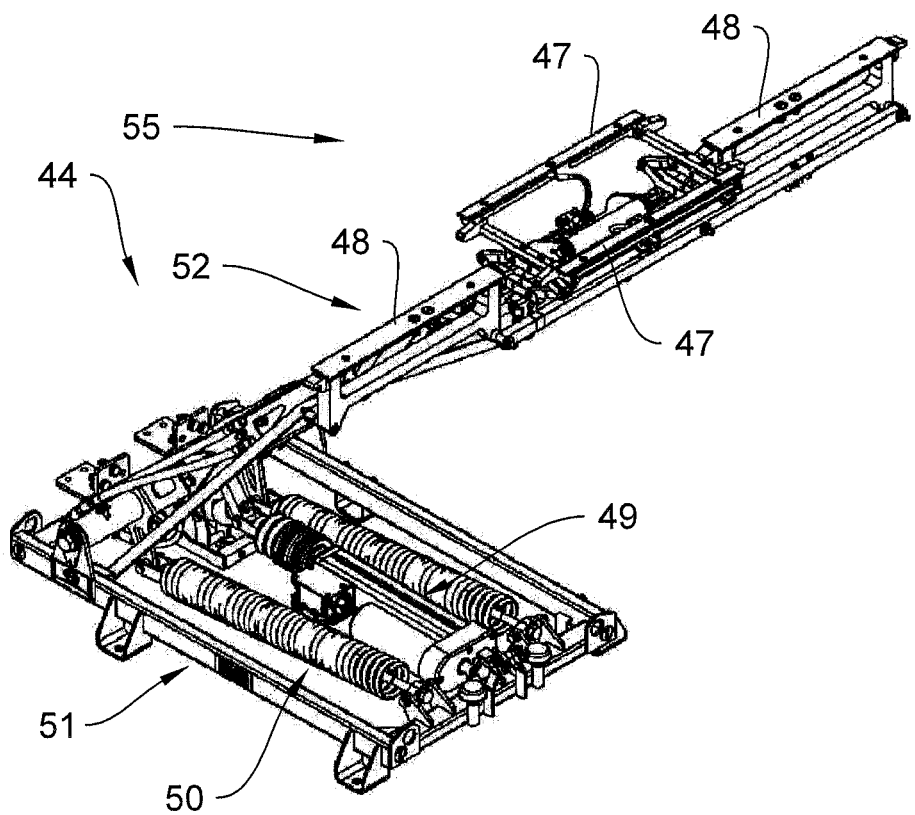
FIG. 3 shows a second embodiment of a positioning unit in a contact position in a perspective view.
Figure 4:
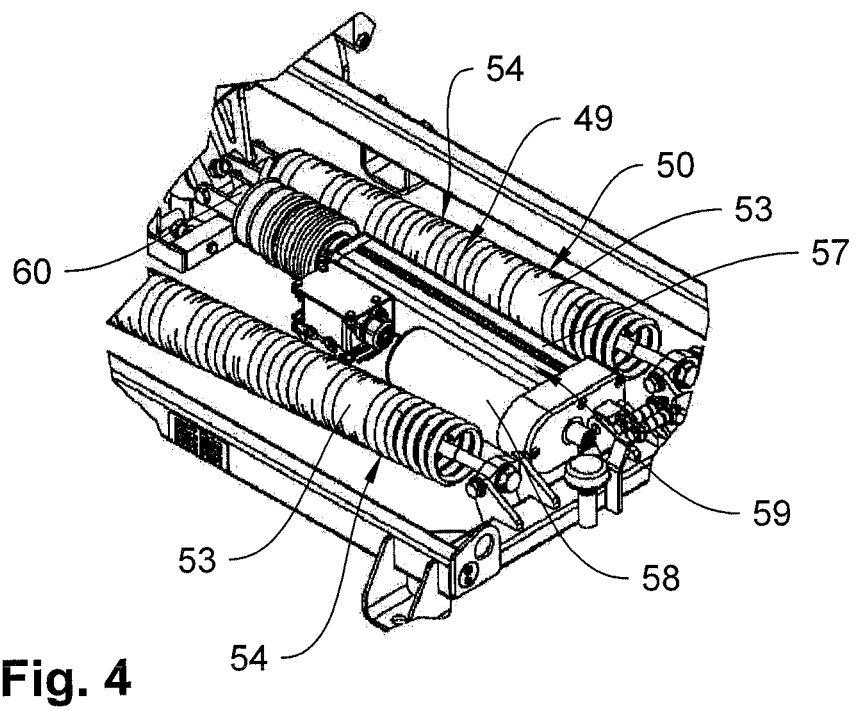
FIG. 4 shows a detailed view of FIG. 3.
Figure 5:
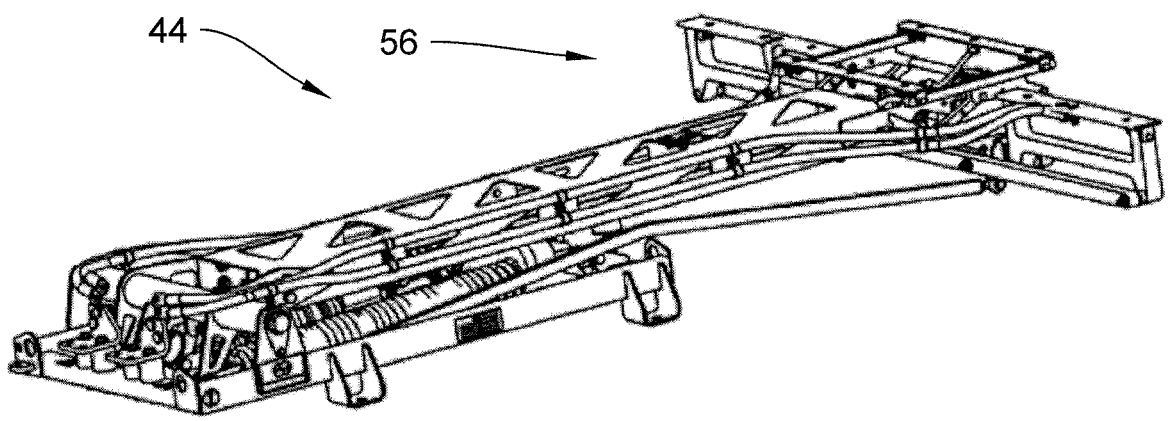
FIG. 5 shows the positioning unit of FIG. 3 in a retracted position in perspective view.
Figure 6:
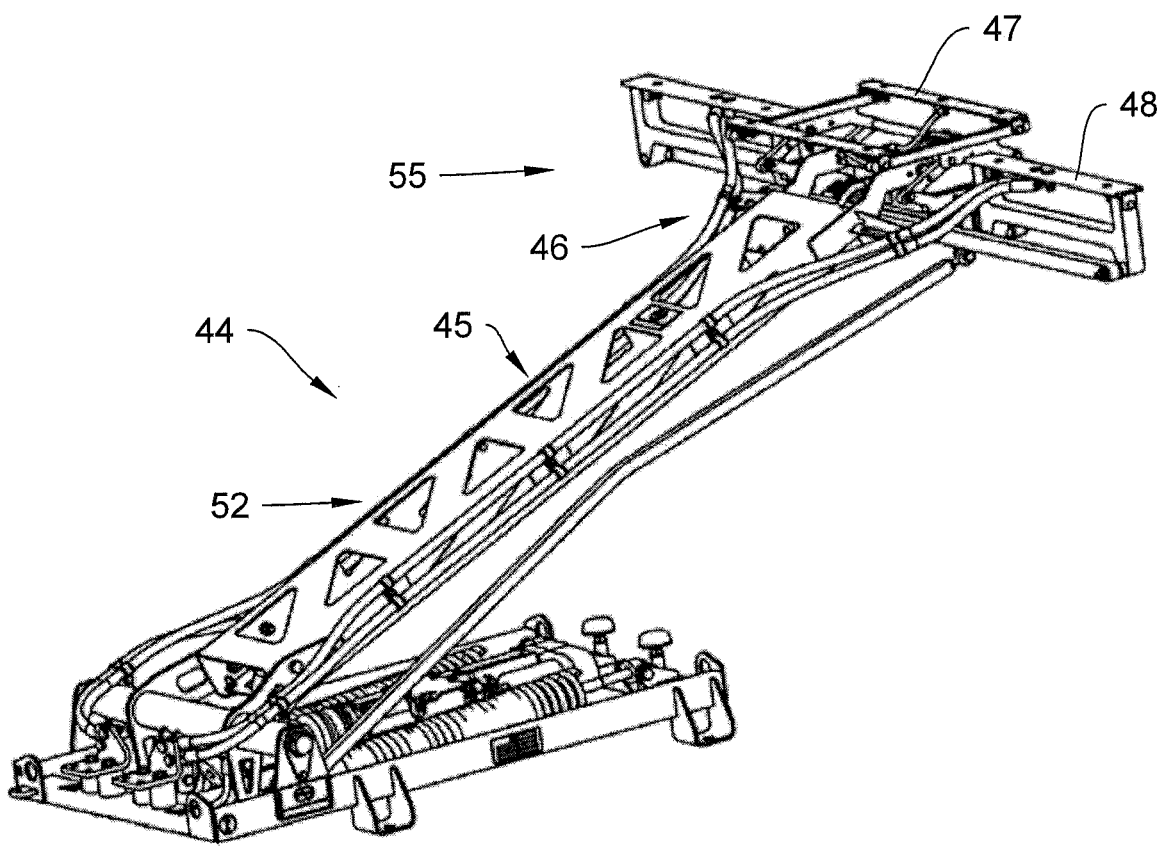
FIG. 6 shows the positioning unit of FIG. 3 in the contact position in a perspective view.

An overview of FIGS. 1 and 2 shows a first embodiment of a positioning unit 10 in various positions. A contacting of a charging contact surface 11 is only illustrated symbolically. The positioning unit 10 comprises an articulated arm device 12 and an adjustment drive 13 for driving the articulated arm device 12. The articulated arm device 12 is designed as a single-arm system 14 and comprises an upper scissor 15 with an upper scissors arm 16 and an upper coupling rod 17 as well as a lower scissor 18 with a lower scissors arm 19 and a lower coupling rod 20. An upper coupling link 21 is swivel-mounted to the upper scissors arm 16, so that a mount 22 of the positioning unit 10 for an electrical charging contact (not shown) of the positioning unit 10 can always be moved parallel to a horizontal plane 23. For this purpose, the upper coupling link 21 is connected to the upper coupling rod 17 via an axis 38. The lower scissors arm 19 and the lower coupling rod 20 are swivel-mounted to fixed bearings 24 and 25, respectively, of a holding frame 26 of the positioning unit 10. The lower scissors arm 19 is swivel-mounted to the upper scissors arm 16 via an axis 27. A swivel movement of the upper scissors arm 16 therefore leads to a parallel movement of the mount 22 relative to the horizontal plane 23.

The adjustment drive 13 is a linear drive 28. A spring device 29 of the positioning unit 10 is formed with a restoring spring 30 that is formed as a tension spring 31. The tension spring 31 is attached to a fixed bearing 31 on the holding frame 26 and to an axis 33 of a lever 34. Together with the axis 33 and the tension spring 31, the lever 34 forms a restoring gear 35. Depending on the position of the articulated arm device 12, the lever 34, which is mounted for co-rotation with the lower scissors arm 19, is swung relative to the tension spring 31 so that an effective length of the lever 34 is shortened or extended. In a retracted position 36 and in a contact position 37 of the positioning unit 10, the tension spring 31 has a direct effect on the axis 33. If the articulated arm device 12 is extended further downwards, an effective length of the lever 34 is shortened significantly through swiveling of the same. Therefore, it is possible to adapt the tension spring 31 or its effective restoring force to a position of the positioning unit 10. The articulated arm device 12 together with the adjustment drive 13 has a design-related gravitational force including a charging contact (not shown) that works on the charging contact or the mount 22. The tension spring 31 causes a spring force or a restoring force that exceeds the gravitational force so that, irrespective of a position of the positioning unit 10, return of the positioning unit to the retracted position 36 is ensured at all times even in the event of a power outage.

A lever 39 that has a control gear 40 for the articulated arm device 11 is firmly fixed to the articulated arm device 12 or the lower scissors arm 19. The linear drive 28 is swivel-mounted on an axis 41 of the lever 39. Furthermore, the linear drive 28 is firmly connected to the holding frame 26 via an axis 42. The linear drive 28 is driven by an electric motor 43 and is not self-locking. This way, for example in the event of a power outage, the tension spring 31 can automatically move the articulated arm device 12 from the contact position 37 to the retracted position 36, which causes the linear drive 28 to be retracted. Therefore, the linear drive also serves for the damping of a movement of the articulated arm device 12. Furthermore, the adjustment drive comprises a control device (not shown) to which the electric motor 43 is connected. A torque of the electric motor 43 is detected by means of the control device, wherein the control device controls the torque of the electric motor 43 in accordance with a contact force that is exerted onto the charging contact surface 11 by the charging contact (not shown). The contact force is strong enough for forming an electric contact and can be formed in a substantially constant manner or at the same level in the contact position 37 as well as in any other optional contact position since the torque of the electric motor 43 is controlled.

An overview of FIGS. 3 to 6 shows a second embodiment of a positioning unit 44 that is mounted on the roof of an electrically driven vehicle (not shown). The positioning unit 44 substantially comprises an articulated arm device 45, at the end 46 of which charging contacts 47 and 48 are located for the contacting of a charging contact surface (not shown) above the vehicle. Furthermore, the positioning unit 44 comprises an adjustment drive 49 and a spring device 50 as well as a holding frame 51. The articulated arm device 45 is formed as a single-arm system 52 similar to the previously described single-arm system. The spring device 50 comprises two tension springs 53 that are formed as lifting springs 54 and exert a lifting force on the articulated arm device 45. Here, the lifting force is determined in a way that a gravitational force of the articulated arm device 45 together with the charging contacts 47 and 48 is greater than the lifting force, so that in the event of a power outage, for example, the articulated arm device 45 descends from a contact position 55 to a retracted position 56 in all cases. The adjustment drive 49 therefore comprises a linear drive 57 without self-locking having an electric motor 58 that is connected to and controlled by a control device (not shown). The control device detects a torque of the electric motor 58, wherein the control device controls the torque of the electric motor 58 in such a way that a defined contact force is formed on the charging contacts 47 and 48. The linear drive 57 for its part comprises a trapezoidal thread spindle (not shown) that, in this case, is accommodated in a housing 59 of the linear drive 57 and acts on a drive rod 60 by means of a nut. Therefore, the articulated arm device can be moved to the contact position 55 or to the retracted position 56 by means of a movement of the drive rod 60.

The invention claimed is:

1. A positioning unit (10, 44) for forming of an electrically conductive connection between a stationary charging station and a vehicle, wherein an electrical charging contact (47, 48) of the positioning unit can be moved relative to a charging contact surface (11) and contacted with same by means of the positioning unit, wherein the positioning unit has an articulated arm device (12, 45) and a drive device for driving the articulated arm device, wherein the charging contact can be positioned between a contact position (37, 55) for power transmission and a retracted position (36, 56) for power interruption by means of the articulated arm device, wherein the drive device has an adjustment drive (13, 49) for forming an adjustment force acting on the articulated arm device and a spring device (29, 50) mechanically cooperating with the adjustment drive, wherein a contact force acting on the charging contact surface can be formed by the adjustment drive, wherein the adjustment drive has a control device and an electric motor (43, 58), which can be actuated by the control device, characterized in that the adjustment drive is designed in such a way that a torque of the electric motor can be detected by the control device, wherein the contact force can be controlled by the control device in accordance with the torque of the electric motor.

2. The positioning unit of claim 1, characterized in that the electric motor (43, 58) is a brushless electric motor.

3. The positioning unit of claim 1, characterized in that the adjustment drive (13, 49) is a linear drive (28, 57).

4. The positioning unit of claim 1, characterized in that the adjustment drive (13, 49) and/or the articulated arm device (12, 45) has a displacement sensor and/or a position sensor.

5. The positioning unit of claim 1, characterized in that the spring device (29, 50) has at least one tension spring (31, 53) or a compression spring that generates a spring force acting on the articulated arm device.

6. The positioning unit of claim 1, characterized in that a spring (31, 53) of the spring device (29, 50) is mechanically coupled with the articulated arm device (12, 45) by means of a lever (34) of a transmission (35) of the spring device, wherein in accordance with a position of the articulated arm device an effective length of the lever is designed in an alterable way.

7. The positioning unit of claim 1, characterized in that the positioning unit (10) comprises a holding device (26) for fastening the positioning unit above a vehicle on a pole or an underpass, wherein the spring device (29) has at least one restoring spring (30) for forming a restoring force acting on the articulated arm device (12), wherein the restoring force is greater than a gravitational force of the articulated arm device acting on the restoring spring in the opposite direction.

8. The positioning unit of claim 1, characterized in that the positioning unit (44) comprises a holding device (51) for fastening the positioning unit on the roof of a vehicle, wherein the spring device (50) comprises at least one lifting spring (54) for forming a lifting force acting on the articulated arm device (45), wherein the lifting force is smaller than a gravitational force of the articulated arm device acting on the lifting spring in the opposite direction.

9. The positioning unit of claim 1, characterized in that the articulated arm device (12, 45) is designed as a single-arm system (14, 52) or as a scissors mechanism or as a pantograph.

10. A method for forming an electrically conductive connection between a stationary charging station and a vehicle, in particular an electric bus or similar, wherein an electrical charging contact (47, 48) of the positioning unit can be moved relative to a charging contact surface (11) and contacted with same by means of the positioning unit (10, 44), wherein an articulated arm device (12, 45) of the positioning unit is driven by a drive device of the positioning unit, wherein the charging contact can be positioned between a contact position (37, 55) for power transmission and a retracted position (36, 56) for power interruption by means of the articulated arm device, wherein an adjustment force acting on the articulated arm device is formed by means of an adjustment drive (13, 49) of the drive device and wherein a spring device (29, 50) of the drive device is mechanically cooperating with the adjustment drive, wherein a contact force acting on the charging contact surface is formed by the adjustment drive, wherein an electric motor (43, 58) of the adjustment drive is actuated by a control device of the adjustment drive, characterized in that a torque of the electric motor is detected by the control device, wherein the contact force is controlled by the control device in accordance with the torque of the electric motor.

11. The method of claim 10, characterized in that the contact force is formed independently of a relative distance of the charging contact surface (11) or of the contact position (37, 55) from the retracted position (36, 56) of the positioning unit (10, 44).

12. The method of claim 10 characterized in that in the contact position (37, 55), during adjustment of a relative distance of the charging contact surface (11) or of the contact position from the retracted position (36, 56) of the positioning unit (10, 44), the contact force is constant.

13. The method of claim 10, characterized in that the torque of the electric motor (43, 58) is set in accordance with a position of the articulated arm device (12, 45) or the adjustment drive (13, 49) by means of the control device.

14. The method of claim 10, characterized in that when a set limit of the torque is exceeded an achievement of the contact position (37, 55) is detected by means of the control device.

15. The method of claim 10, characterized in that the torque of the electric motor (43, 58) is limited and constantly maintained by means of the control device upon achieving a target value of the torque.

16. The method of claim 15, characterized in that the target value of the torque is controlled within a tolerance range of +/10% by means of the control device.

17. The method of claim 10, characterized in that a maximum speed of the electric motor (43, 58) is reached within a period of 0 to 7 seconds of the motor running, by means of the control device.

18. The method of claim 10, characterized in that a speed of the electric motor (43, 58) is controlled in such a way that the charging contact (47, 48) is moved at a constant velocity at least in sections by means of the control device.

19. A positioning unit (10, 44) for forming of an electrically conductive connection between a stationary charging station and a vehicle, wherein an electrical charging contact (47, 48) of the positioning unit can be moved relative to a charging contact surface (11) and contacted with same by the positioning unit, wherein the positioning unit has an articulated arm (12, 45) and a drive for driving the articulated arm, wherein the charging contact can be positioned between a contact position (37, 55) for power transmission and a retracted position (36, 56) for power interruption by the articulated arm, wherein the drive has an adjustment drive (13, 49) for forming an adjustment force acting on the articulated arm and a spring device (29, 50) mechanically cooperating with the adjustment drive, wherein a contact force acting on the charging contact surface can be formed by the adjustment drive, wherein the adjustment drive has a controller and an electric motor (43, 58) actuated by the controller, characterized in that the contact force is controlled by the controller in accordance with a torque of the electric motor detected by the controller.

* * * * *

UNITED STATES PATENT AND TRADEMARK OFFICE
CERTIFICATE OF CORRECTION

PATENT NO. : 10,913,359 B2
APPLICATION NO. : 16/086660
DATED : February 9, 2021
INVENTOR(S) : Alexander Pachler Page 1 of 1

It is certified that error appears in the above-identified patent and that said Letters Patent is hereby corrected as shown below:

In the Claims

Column 11, Claim 16, Line 30 - Please replace +/ 10 % with --- +/– 10 % ---

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*